Figure 1:
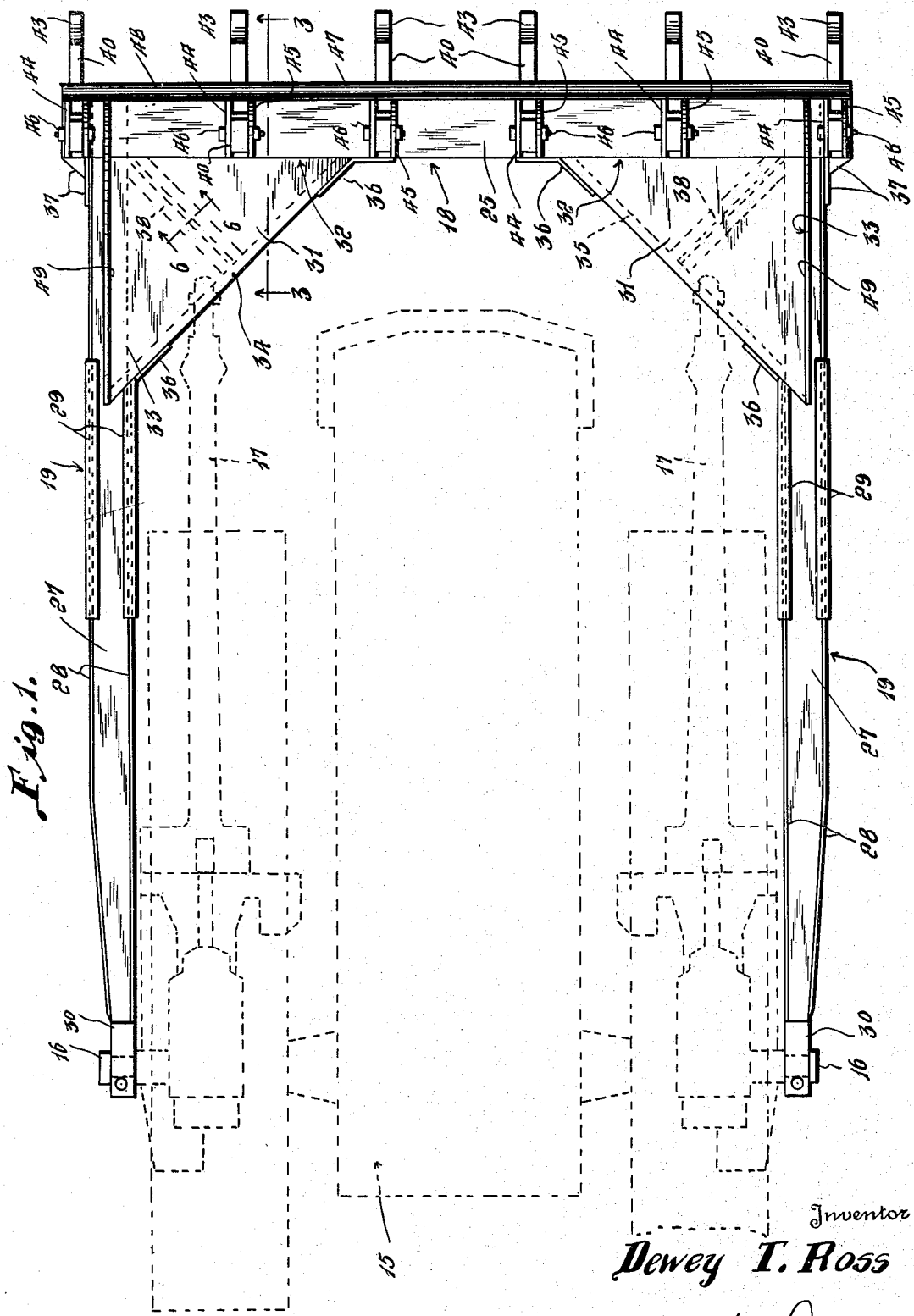

Dec. 8, 1942.  D. T. ROSS  2,304,282
TIMBER RAKE
Filed Jan. 31, 1941  3 Sheets-Sheet 1

Inventor
Dewey T. Ross
By Bryant & Lowry
Attorneys

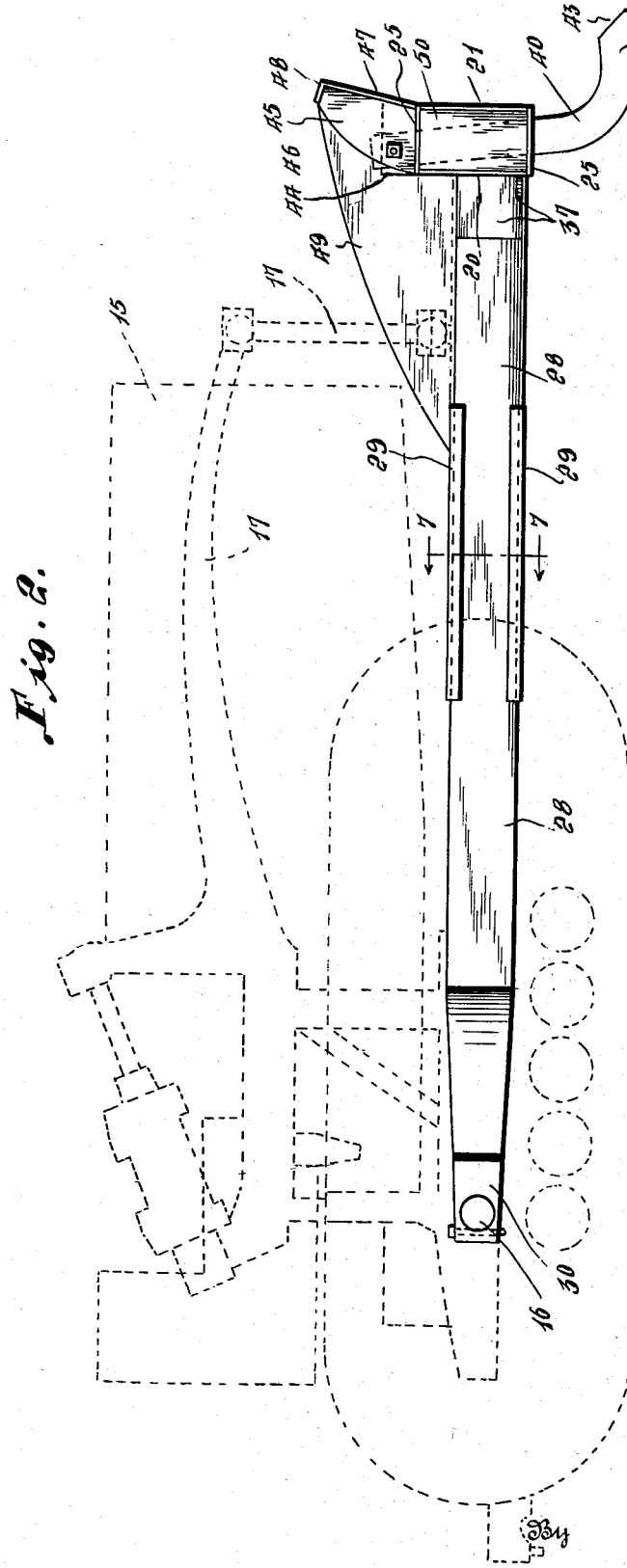
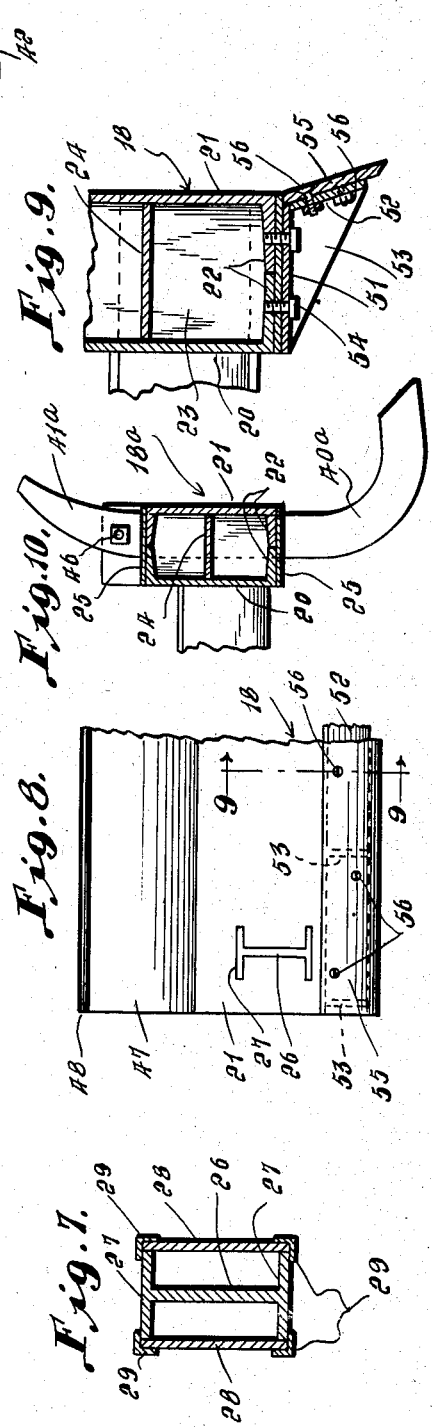
Inventor
Dewey T. Ross

Dec. 8, 1942. D. T. ROSS 2,304,282
TIMBER RAKE
Filed Jan. 31, 1941 3 Sheets-Sheet 3
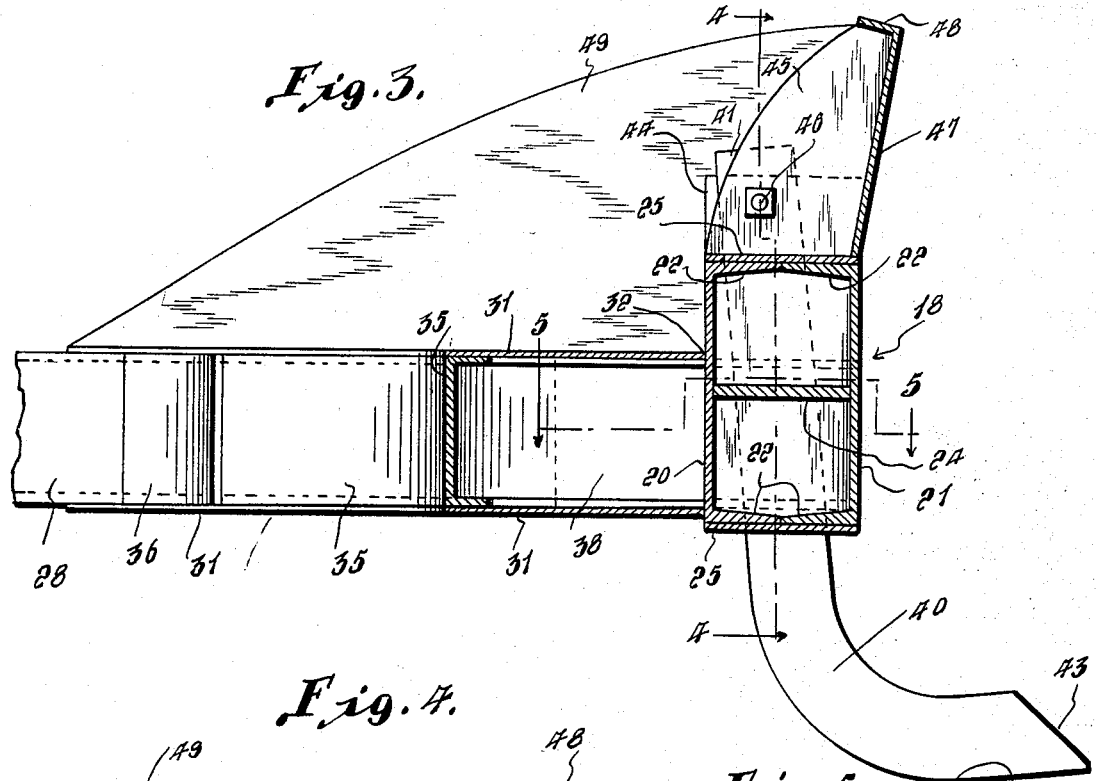
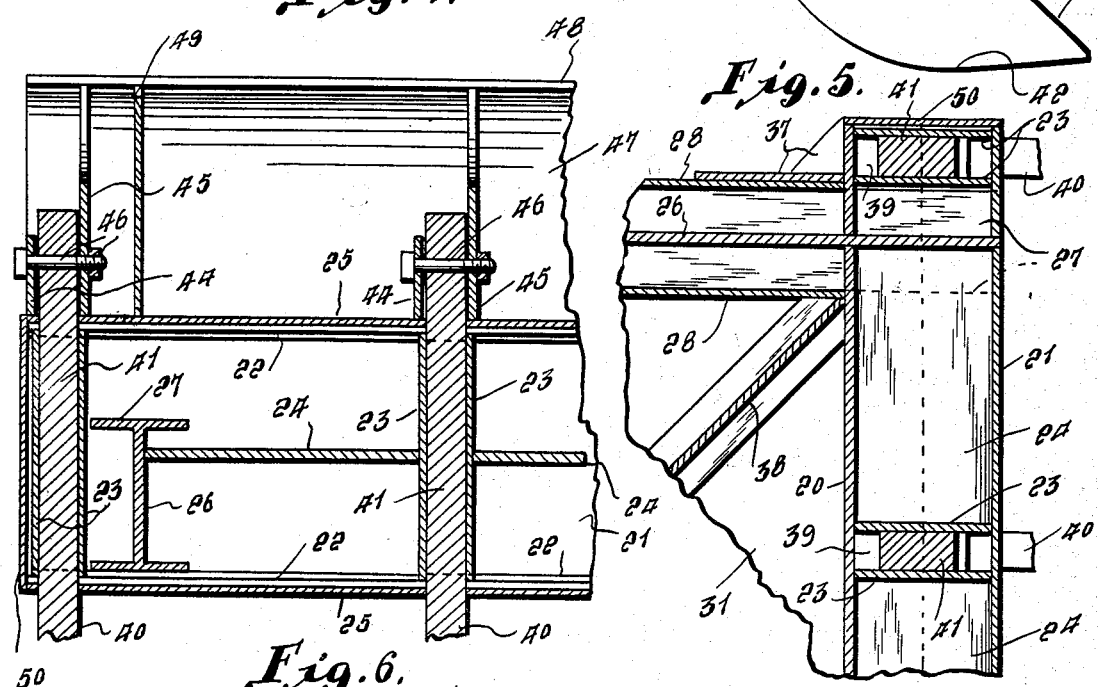
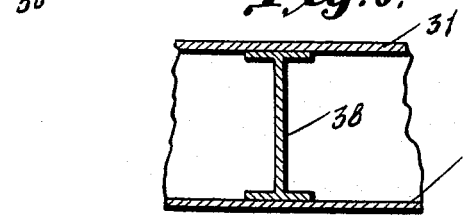
Inventor
Dewey T. Ross
By Bryant & Lowry
Attorneys Patented Dec. 8, 1942

2,304,282

UNITED STATES PATENT OFFICE 2,304,282

TIMBER RAKE

Dewey T. Ross, Tyler, Tex.

Application January 31, 1941, Serial No. 376,887

2 Claims. (Cl. 214—130)

This invention relates to certain new and useful improvements in timber rakes.

The primary object of the invention is to provide a timber rake. wherein a rake element including a cross head having removable teeth has side frame bars for pivotal support upon a tractor or other machine so that the timber rake may be constructed as an attachment for a tractor or the like, provision being made for the raising and lowering movements of the cross head of the timber rake.

A further object of the invention is to provide a timber rake of the foregoing character wherein the cross head of the rake possesses great strength in the fabrication thereof, the rake teeth being so designed as to ride upon the surface of the ground primarily for the gathering of logs, tree trunks and like timber in land clearing operations without conveying soil or dirt with the gathered timber.

A still further object of the invention is to provide a timber rake of the foregoing character, wherein the forwardly positioned cross head of the rake extends in a straight line transversely of the forward end of a tractor or other mobile machine to which the rake is attached, the lower side of the cross head being provided with specially designed rake teeth for riding upon the surface of the ground and the lifting of the timber being gathered, while the upper side of the cross head of the rake is designed to give a rolling motion and to position forwardly felled trees, resulting in the crushing of the tree branches for tightly packing the gathered timber into a pile for burning.

A further object of the invention is to provide a timber rake wherein the cross head of the rake carries removable teeth so that a scraper blade may be mounted upon the cross head in lieu of the teeth with the apparatus then functioning as a bulldozer.

With the above and other objects in view that will become apparent as the nature of the invention is better understood, the same consists in the novel form, combination and arrangements of parts hereinafter more fully described, illustrated in the accompanying drawings and claimed.

In the drawings:

Fig. 1 is a top plan view of a timber rake constructed in accordance with the present invention, the same being shown as associated with a mobile machine such as a tractor indicated by dotted lines, Fig. 2 is a side elevational view of the timber rake, the tractor being illustrated by dotted lines, Fig. 3 is a fragmentary vertical longitudinal sectional view taken on line 3—3 of Fig. 1, showing the structure of the cross head of the rake, the timber gathering teeth extending below the cross head and the forwardly inclined mold boards at the upper side of the cross head, Fig. 4 is a fragmentary vertical cross-sectional view taken on line 4—4 of Fig. 3, showing a rake tooth vertically extending through the cross head of the rake and removably secured therein, Fig. 5 is a fragmentary horizontal sectional view taken on line 5—5 of Fig. 3, Fig. 6 is a detail sectional view taken on line 6—6 of Fig. 1, showing a bracing structure between the cross head and side bars of the brake, Fig. 7 is a cross-sectional view taken on line 7—7 of Fig. 2, showing the reinforced construction of a side bar of the rake, Fig. 8 is a fragmentary front elevational view of the cross head with the rake teeth removed and a scraper blade mounted upon the cross head for converting the timber rake into a bulldozer, Fig. 9 is a detail sectional view taken on line 9—9 of Fig. 8, and Fig. 10 is a fragmentary sectional view, similar to Fig. 3, of a modified form of construction, wherein the teeth of the timber rake carry upwardly and forwardly inclined upper ends above the cross head to function as a timber engaging mold board.

Timber rakes of the character described in this application are designed for unusually heavy duty service in the raking and clearing of lands of timber of any size and it is essential that the rake be possessed of unusual strength which results from the fabrication of steel structural elements and brace devices. The present invention is primarily a timber rake adapted for attachment to a tractor with the rake comprising a cross head carrying rake teeth and side bars having their rear ends pivotally supported upon opposite sides of a tractor with elevating means carried by the tractor and attached to the forward end of the rake to raise and lower the cross head of the rake when desired. The operative ends of the rake teeth are designed for riding upon the surface of the ground and to impart a lifting movement to the gathered timber in the path of the machine, forwardly inclined baffle means at the upper side of the cross head being designed for imparting a rolling motion to the timber gathered and raised by the rake teeth, resulting in the crushing of tree branches and the compacting of the timber when placed in a pile for burning.

Referring more in detail to the accompanying drawings and particularly to Figs. 1 and 2, there is illustrated by dotted lines a tractor or other mobile machine indicated by the reference character 15 that has projecting from opposite sides thereof adjacent its rear end a pair of journal bars 16 upon which the timber rake is pivotally supported. The tractor machine further includes raising and lowering means shown by dotted lines and indicated by the reference character 17 at opposite sides thereof for attachment to the forward end of the timber rake, it being noted that the tractor machine together with the raising and lowering means 17 constitutes standard construction of a tractor machine.

The timber rake comprises a cross head designated in general by the reference character 18 and a mounting side bar 19 projecting rearwardly from each end of the cross head 18 with the rear ends of the side bars 19 pivotally supported upon the journal bars 16.

The cross head 18 of the rake as shown more clearly in Figs. 3 to 5 is of casing design and is preferably formed of a pair of channel bars 20 and 21 having edge flanges 22 ultimately placed in edge abutting relation to provide the casing structure. In the fabrication of the cross head 18 that preferably extends in a straight line transversely of the forward end of the tractor 15, provision is made therein for the mounting of rake teeth to be later described. Prior to the assembly of the two channel bars 20 and 21, pairs of spaced vertical plates 23 are mounted in spaced relation within the channel bar 20 and are welded on their lines of contact with the inner faces of the channel bar 20 and the edge flanges 22. For further reinforcing the cross head 18 horizontally disposed plates 24 are mounted in the channel bar 20 between the adjacent plates of the plate pairs 23 and said reinforcing plates 24 are welded at their lines of contact with the inner face of the channel bar 20 and the adjacent faces of the plates 23. The vertical plates 23 and the horizontal reinforcing plates 24 project outwardly of the channel bar 20 a distance substantially equal to the length of the side flanges 22 of the channel bar 21 so that when the channel bar 21 is assembled with the channel bar 20 contact is made by the plates 23 and 24 with the inner faces of the channel bar 21 and the side flanges 22 thereby as clearly shown in Fig. 3, with the edges of the side flanges 22 of the two channel bars contacting and welded together, thereby producing a cross head of unusual strength. For a further reinforcement of the cross head 18, top and bottom plates 25 flatly engage the outer faces of the side flanges 22 of the channel bars and said plates 25 are welded to the channel bars.

Each side bar 19 of the timber rake as shown more clearly in Figs. 1, 2, 5 and 7 is preferably formed of an H-beam having a cross web 26 and side flanges 27, the opposite sides of the side flanges 27 having longitudinally extending reinforcing side plates 28 welded at their edges thereto. A further reinforcement for the side bars 19 comprises angle iron bars 29 welded to the corner of the side bars over those portions of the side bars that are subjected to unusual strains during the operation of the timber rake. The rear ends of the side bars 19 are formed into bars 30 for pivotal support upon the journal bars 16.

The forward ends of the H-beams of the side bars extend through H-shaped slotted openings in the ends of the channel bars 20 and 21 and are welded to said channel bars at their lines of engagement therewith. To reinforce the connection between the side bars 19 and the cross head 18 and to maintain the right angular disposition of the side bars relative to the cross head, reinforcing corner braces are arranged at the inner sides of the cross head and the side bars. As shown more clearly in Figs. 1, 3, 5 and 6 a pair of vertically spaced parallel triangular plates 31 are welded at one side edge to the outer face of the rear channel bar 20 on the lines 32, while the outer side edges 33 of the triangular plates 31 overlap the upper and lower sides 27 of the H-beams and are welded thereto, the other angular edge 34 of the brace plates 31 extending between the cross head and the side bars having the channel iron 35 as shown in Fig. 3 inserted therein and welded thereto. Reinforcing brace plates 36 are welded to the ends of the diagonal edge 34 of the brace plates 31 for further strengthening the rake structure. From an inspection of Figs. 1 and 5 it will be observed that the side bars are set slightly inwardly of the opposite ends of the cross head 18 of the rake and at these corners additional reinforcing plates 37 are welded to the adjacent elements. An additional brace element for the triangular plates 31 comprises the H-beam 38 arranged between the upper and lower plates 31 as shown in Figs. 1 and 6, being welded to said plates and extending from the points of connection between the cross head and side bars to the edges 34 of the plates 31 between the ends thereof.

From an inspection of Figs. 1, 4 and 5 it will be observed that the pairs of vertical plates 23 provide pockets 39 within the cross head 18 for the mounting of rake teeth, the top and bottom walls of the cross head being provided with openings as shown in Fig. 4 for the passage of the rake teeth. In the form of invention illustrated in Figs. 1 to 7 each rake tooth 40 includes a shank 41 that has abutting side contact with the adjacent faces of the plates 23, the lower end of the rake tooth 40 being arched forwardly and slightly upwardly as at 42 with a rearwardly and upwardly directed beveled end 43. To removably secure the rake tooth 40 in position in the cross head 18, the upper end of the shank 41 of the rake tooth extends above the upper end of the head 18 as shown in Figs. 1, 3 and 4 and between a pair of vertical brace plates 44 and 45 that are welded at their lower edges to the upper side of the cross head 18, said brace plates 44 and 45 and the upper projecting end of the rake tooth shank having registering openings therein for the passage of a retaining nut and bolt combination 46.

A forwardly and upwardly inclined bevel plate or mold board 47 is welded at its lower edge to the upper forward edge of the cross head and has a rearwardly directed reinforcing flange 48 at its upper edge, and to further brace and strengthen the mold board 47, the brace plate 45 is of such size as to have its forward and upper edges contact the inner faces of the mold board 47 and reinforcing flange 48 for welding thereto. To further reinforce the mold board 47, a relatively large perpendicular plate 49 is arranged adjacent each end of the cross head above the adjacent side bar 19 and has the lower forward corner cut away to interfit with the adjacent portions of the cross head with the edges of the reinforcing plates that contact the side bars, cross head and the inner faces of the mold board being welded thereto, the reinforcing plates 49 extending a considerable distance rearwardly of the cross head for a more effective reinforcing of the mold boards.

It is understood that any number of rake teeth desired may be removably mounted in the cross head. As shown in Figs. 2, 4 and 5 end plates 50 provide closures for the ends of the cross head and these end plates are welded in position to the ends of the channel bars 20 and 21.

The present invention is primarily designed for surface work and is particularly adapted for the disposal of timber that has been felled without the necessity of cutting the timber into small pieces and is to be distinguished from such machines as are employed for tree or stump pulling or a rooter and is not designed in any manner for underground service. The special design of the rake teeth having the forwardly and upwardly inclined lower ends 42 and the beveled terminal ends 43 are effective for riding upon the surface of the ground and for sifting out all dirt and foreign matter. The timber rake is of such size that the same may be manipulated to cause adjacent teeth to straddle some tree stumps while the elevating mechanism 17 of the tractor 15 may raise the cross head carrying the teeth over stumps if desired. The timber rake is employed for the gathering or raking of timber to be piled and destroyed as by burning. The rake teeth slide under the timber and in view of the slightly upturned ends 42 of the teeth there is a tendency for the timber to be slightly raised and when the timber is contacted by the upwardly and forwardly inclined mold board 47 a rolling motion is imparted to the timber to cause a crushing of the branches thereof and a compacting of the timber during its delivery to a pile. The machine is readily maneuverable and by the use of the elevating means, timber gathered by the rake may be elevated to move the timber over an obstruction such as a large stump encountered in its path of travel.

When it is desired to convert the timber rake into a bulldozer, the rake teeth 40 are removed from the cross head 18, and as shown in Figs. 8 and 9, an angular plate structure comprising wall portions 51 and 52 with triangular brace plates 53 therebetween has the wall portion 51 removably bolted as at 54 to the lower side of the cross head 18, while a cutting blade 55 is removably bolted as at 56 to the angular wall portion 52 with the upper edge of the cutting blade 55 flush with the front face of the cross head 18. The timber rake is thereby converted into a bulldozer for ground levelling or like operations.

It is also contemplated that in lieu of the mold board 47 with its attendant bracing elements that the rake teeth may be constructed to have the upper ends thereof function as a mold board to produce a rolling and crushing action on the gathered timber, and as shown in Fig. 10, the cross head 18a of the rake has rake teeth 40a carried thereby, the upper ends 41a of the rake teeth extending above the cross head and forwardly and upwardly arched as illustrated.

From the above detailed description of the invention, it is believed that the construction and operation thereof will at once be apparent, and while there are herein shown and described the preferred embodiments thereof, it is to be understood that minor changes may be made in the details of construction, such as will fall within the scope of the invention as claimed.

I claim:

1. In combination with a tractor having elevating means, a timber rake having a cross head extending transversely of the front end of the tractor and side bars with the rear ends of the side bars pivotally attached to opposite sides of the tractor adjacent the rear end thereof, rake teeth carried by the cross head and brace members interposed between opposite ends of the cross head and the inner sides of the side bars and upwardly and forwardly inclined means at the upper side of the cross head for effecting a forward rolling and crushing of timber being moved by the rake teeth, said upwardly and forwardly inclined means including extensions on the upper ends of the rake teeth above the cross head.

2. In combination with a tractor having elevating means, a timber rake having a cross head extending transversely of the front end of the tractor and side bars with the rear ends of the side bars pivotally attached to opposite sides of the tractor adjacent the rear end thereof, rake teeth carried by the cross head and brace members interposed between opposite ends of the cross head and the inner sides of the side bars, said cross head extending in a straight line whereby contact over the entire length of its forward face may be had with timber being raked and upwardly and forwardly inclined means at the upper side of the cross head for effecting a forward rolling and crushing of timber being moved by the rake teeth, said upwardly and forwardly inclined means including extensions on the upper ends of the rake teeth above the cross head.

DEWEY T. ROSS.